United States Patent
Beck et al.

(10) Patent No.: US 7,699,410 B2
(45) Date of Patent: Apr. 20, 2010

(54) METHOD AND DEVICE FOR CONTROLLING A WHEEL BRAKE OF A MOTOR VEHICLE

(75) Inventors: Harald Beck, Wuerzburg (DE); Ulrich Gottwick, Stuttgart (DE); Dirk Ortlinghaus, Ludwigsburg (DE); Michael Schubert, Althengstett (DE)

(73) Assignee: Robert Bosch GmbH, Stuttgart (DE)

( * ) Notice: Subject to any disclaimer, the term of this patent is extended or adjusted under 35 U.S.C. 154(b) by 1779 days.

(21) Appl. No.: 09/965,776

(22) Filed: Sep. 27, 2001

(65) Prior Publication Data
US 2002/0074855 A1  Jun. 20, 2002

(30) Foreign Application Priority Data
Sep. 27, 2000  (DE) ................ 100 47 761

(51) Int. Cl.
*B60T 8/60* (2006.01)
(52) U.S. Cl. ........................ 303/155; 303/20
(58) Field of Classification Search ............ 303/3, 303/15, 20, 192, 155; 188/DIG. 2
See application file for complete search history.

(56) References Cited

U.S. PATENT DOCUMENTS

| | | | |
|---|---|---|---|
| 4,327,414 A | | 4/1982 | Klein |
| 4,923,056 A | * | 5/1990 | Nedelk ................ 303/9.61 |
| 5,190,358 A | * | 3/1993 | Holzmann et al. ........ 303/9.71 |
| 5,209,329 A | * | 5/1993 | Sigl et al. .................. 303/176 |
| 5,415,467 A | * | 5/1995 | Utz et al. ..................... 303/89 |
| 5,984,429 A | | 11/1999 | Nell et al. |
| 6,015,194 A | * | 1/2000 | Decker ..................... 303/155 |
| 6,053,581 A | * | 4/2000 | Siepker ........................ 303/3 |
| 6,053,584 A | * | 4/2000 | Schunck et al. ........... 303/167 |
| 6,139,117 A | * | 10/2000 | Shirai et al. ................. 303/20 |
| 6,270,172 B1 | * | 8/2001 | Shirai et al. ................. 303/20 |
| 6,305,511 B1 | * | 10/2001 | McCann et al. .............. 303/20 |
| 6,332,654 B1 | * | 12/2001 | Yano ........................... 303/89 |
| 6,382,741 B1 | * | 5/2002 | McCann et al. ............ 303/191 |
| 6,416,140 B1 | * | 7/2002 | Yamamoto et al. ......... 303/122 |
| 6,428,120 B1 | * | 8/2002 | Holl ........................... 303/191 |

FOREIGN PATENT DOCUMENTS

| | | |
|---|---|---|
| DE | 29 26 017 | 2/1981 |
| DE | 196 11 360 | 9/1997 |
| DE | 198 43 861 | 4/2000 |
| DE | 199 50 029 | 4/2001 |

OTHER PUBLICATIONS

SAE Technical Paper 960991, "Electrohydraulic Brake System—The First Approach to Brake-By-Wire Technology", Wolf-Dieter Jonner, Hermann Winner, Ludwig Dreilich, and Eberhardt Schunck (Feb. 1996).

* cited by examiner

*Primary Examiner*—Thomas J Williams
(74) *Attorney, Agent, or Firm*—Kenyon & Kenyon LLP (57) ABSTRACT

Method and device for controlling an automotive wheel brake, in which in a predefined operating situation, for example at a standstill, the braking force or brake pressure built up, and/or the dynamics of change, are limited. Two pressure control circuits are connected so that the pressure on the two respective wheel brakes is regulated by a pressure control circuit. A wheel brake is completely released in the predefined operating situation.

4 Claims, 5 Drawing Sheets

Fig.3c

METHOD AND DEVICE FOR CONTROLLING A WHEEL BRAKE OF A MOTOR VEHICLE

FIELD OF THE INVENTION

The present invention relates to a method and a device for controlling a wheel brake of a motor vehicle.

BACKGROUND INFORMATION

An electrically controlled brake system is discussed, for example, in SAE Paper 960991, using the example of an electrohydraulic brake system, in which the driver's desired braking is derived from the driver's operation of the brake pedal. This is converted into setpoint brake pressures for the individual wheel brakes, optionally taking into account other operating parameters, and optionally taking into account wheel-specific functions (for example, anti-skid systems, stability programs, etc.). These brake pressures are then regulated for each wheel by pressure control circuits on the basis of the setpoint pressure and the actual pressure measured in the area of the wheel brake.

A corresponding method or procedure based on braking torque or braking force control circuits for the individual wheels is performed in conjunction with wheel brakes having brake actuators which can be controlled by an electric motor. Braking torque or braking force control circuits can also be used in conjunction with electrohydraulic or electropneumatic brake systems.

Such electric regulators set the desired braking stipulated primarily by the driver (brake pressure, braking force, braking torque, vehicle deceleration, etc.) without regard for the respective operating situation using the dynamics of normal braking. There are operating situations in which implementation of the driver's stipulation is irrelevant for the driver. This is the case when the vehicle is standing still, for example. In this case, the driver would only like to prevent the vehicle from rolling away. If the driver's stipulation is also completely implemented in such an operating situation, vehicle comfort is limited, for example, due to adjustment noises, valve noises and pump noises. Furthermore, the vehicle electric system in this situation is unnecessarily burdened by actuation of actuators, and/or in the case of an electrohydraulic brake system, by hydraulic components and/or the controller being under load. In the case of hydraulic components, the vibration fatigue strength of the housing, and the wear on pump element gaskets, motor brushes and the valve seat are especially important.

Also, in the case of the controller, complete implementation of the driver's stipulation in such an operating situation can lead to a reduction in average component lifetime due to heating. Such an operating situation does not only occur when the vehicle is standing still, but also when the vehicle is moving in braking operations that do not require any high braking force build-up dynamics (e.g., in braking operations in which the driver does not operate the brake pedal beyond a certain extent or not at a great rate of change, or in the range of low driving speeds). Implementation of such a driver's intent (or input) with the build-up dynamics provided for sharper braking also leads to the above-mentioned loads.

Low-power measures, which prevent the controller temperature from exceeding critical levels due to self-heating, have been discussed in the context of load reduction (e.g., in German Published Patent Application No. 198 43 861).

SUMMARY OF THE INVENTION

When the vehicle is standing still, the braking force (brake application force, brake pressure, etc.) may be limited to levels that keep the vehicle, having a certain weight, at a predefined gradient, so that the driver's intent (input) may be implemented only inasmuch as it seems technically practical. In an exemplary embodiment and/or exemplary method, the driver's stipulation may be taken into account if the driver wants to remain at a standstill, for example, or if he would like to let the vehicle roll by releasing the brake pedal. However, brake application operations that are not technically feasible may be limited to a practical extent.

This may reduce loads in an advantageous manner, permitting design efficiency measures, such as a reduction in wall thickness of the hydraulic housing, a reduction in heat dissipation measures in the controller, a reduction or complete elimination of noise measures, an adapted design of parts subject to wear, etc.

These advantages may be obtained by limiting the braking force or brake pressure when the vehicle is at a standstill.

It may also be advantageous if pressure control on the wheels of a brake circuit is performed by a single pressure regulator in an electrohydraulic brake system by using a controllable valve instead of controlling the pressure on the individual wheels. In this case, the second and optionally additional pressure control circuits may be deactivated. This measure may also lead to a reduction in the load on components, not only when the vehicle is standing still, but also when driving in the case of braking operations that do not require individual wheel brake pressure control.

The same may be true of limiting the maximum possible change in braking force or pressure, which entails a reduction in load for driving operation as well as standstill operation. During driving, this may be used for braking operations that do not require any high braking force buildup dynamics (for example, slight pedal operation, low rate of change, low driving speed, etc.).

An especially great load reduction may be achieved when the brakes are completely released for individual wheels at a standstill and/or in driving operation at a low driving speed or a low desired braking force or change in braking force, with their contribution to braking of the vehicle being covered by the other wheels. It may be especially advantageous not to build up any braking force in individual wheel brakes or in wheel brakes on one axle (e.g., rear wheels or front wheels) in such suitable braking situations.

DETAILED DESCRIPTION

Figure 1:
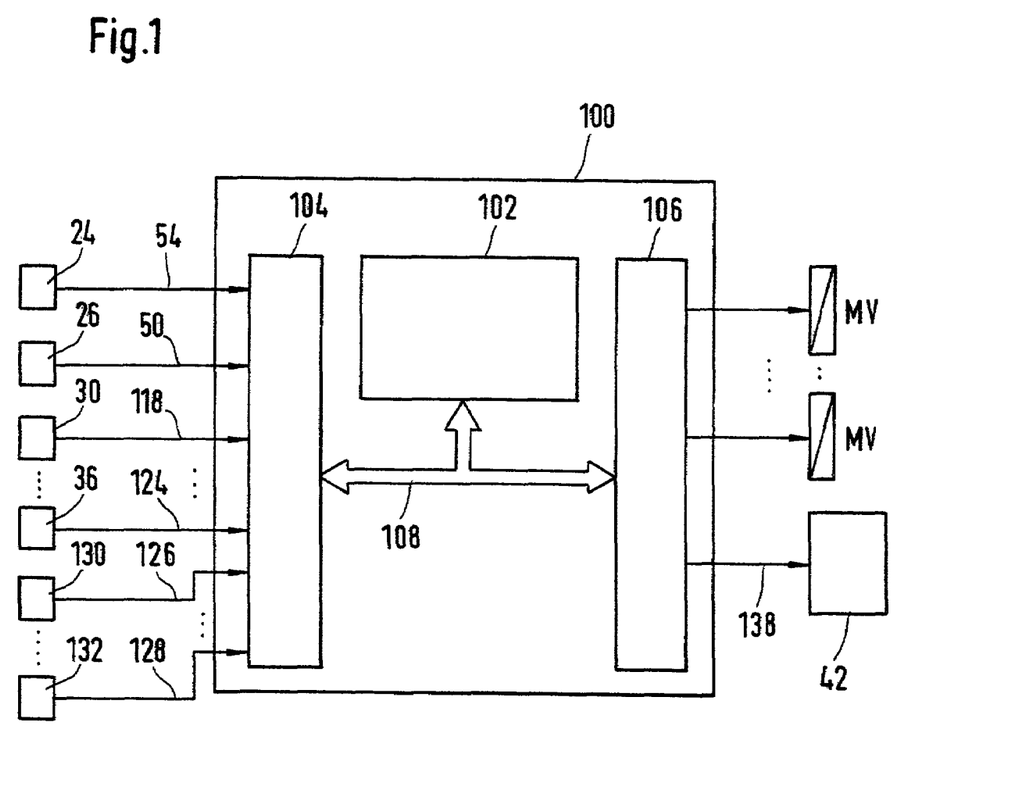
FIG. 1 shows a survey diagram of a control unit for controlling an electrohydraulic brake system which represents an exemplary embodiment and/or exemplary method of the present invention.

FIG. 1 shows a control device for controlling an electrohydraulic brake system which represents an exemplary application of the method or procedure according to the present invention. An electronic control unit 100 includes at least one microcomputer 102, an input circuit 104, an output circuit 106, and a bus system 108 which connects these elements. In an exemplary embodiment, lines 50 and 54 lead to input circuit 104 from measurement devices 24 and 26, each of which determines a signal which represents the extent of operation of a brake pedal. Furthermore, input lines 118 through 124 connect input circuit 104 to sensors 30 through 36 assigned to each wheel brake. In an exemplary embodiment, these sensors are the pressure sensors of an electrohydraulic brake system, while in other exemplary embodiments they are braking force sensors. Additional input lines 126 through 128 connect input circuit 104 to measurement devices 130 through 132 for detecting additional performance quantities of the brake system, the vehicle, and/or its drive unit. Such quantities may include, for example, wheel speeds, the engine torque delivered by the drive unit, axial loads, etc. Several output lines are connected to output circuit 106. The output lines, over which valves of the pressure modulators assigned to each wheel brake are operated, are shown here, as an example. At least one pump 42 is actuated over an additional output line 138.

Control unit 100, and the programs implemented in microcomputer 102 therein, controls the wheel brakes as a function of the signal quantities supplied in the sense of the brake control discussed in the related technical areas.

In normal operation of the brake system, the driver's intent to decelerate is derived on the basis of at least one of the signals representing operation of the brake pedal, which is optionally converted into setpoint brake pressure values for the individual wheel brakes, and which optionally takes into account other quantities such as axial loads, wheel-specific functions such as an anti-skid controller, etc. These setpoint brake pressure values are then sent to wheel-specific pressure regulators which may make the brake pressure in the wheel brakes agree with the respective setpoint pressure by operation of the respective valve arrangement, and taking into account the actual brake pressure.

Alternatively, the braking force, in particular the brake application force, may be regulated instead of the brake pressure. Regulating the brake application force may be advantageous in conjunction with fluidless brake systems, (e.g., wheel brakes having electric motor application of the brake shoes), but also may be advantageous in electrohydraulic or electropneumatic brake systems. According to the method or procedure described above, a setpoint braking force is determined for each wheel and is then set on each wheel by wheel-specific braking force regulators. The preceding description of normal operation, like the following descriptions of special operating states, may also apply in conjunction with electromechanical wheel brakes.

Thus in the normal operation described above, the stipulated value derived from the driver's intent may be set under all circumstances. This may be true of the brake pressure or the braking force level, the dynamics in build-up of brake pressure or braking force, and the wheel-specific control of the individual wheel brakes. There may be operating situations in which implementation of the driver's intent in the manner described above is irrelevant for the driver and merely contributes to an increased load on the components of the brake system.

One of these operating states may be when the vehicle is standing still. At a standstill, it may not be technically necessary to apply higher wheel brake pressures or braking forces in the wheel brakes than is necessary to hold the vehicle on a steep incline with a slope of approx. 30%, for example, with an allowed total weight. In the case of an electrohydraulic brake system, this value may be approximately 50 bar. It may bring considerable relief for the components of the brake system if the brake pressure or the braking force on the wheel brakes is limited when the vehicle is standing still. For example, if it is determined that the vehicle is standing still by derivation from wheel speed information, then the pressure or braking force to be set may no longer be determined and implemented according to the driver's stipulation (maximum pressure in an electrohydraulic brake system is 150 bar, for example), but instead, it may be limited to a predefined value which complies with the condition indicated above, for example. If the braking force or the wheel brake pressure is above this limit value for stopping the rolling vehicle, then limit value may be approached over a time ramp when standstill is detected.

Furthermore, in an alternative embodiment, the standstill of the vehicle may be monitored. If the vehicle nevertheless moves because of damaged brake linings or overloading, then if the driver still wants the vehicle to stand still, the pressure or braking force on the wheels may be increased over a steep time ramp until the vehicle is stopped. If such a measure for monitoring standstill is provided, the brake pressure on all wheels of the vehicle at a standstill may be reduced so long as the vehicle is not rolling. If movement of a wheel is detected, this minimum standstill pressure or minimum standstill braking force may be increased until the vehicle stops, if the driver still wants the vehicle to be at a standstill.

In another embodiment of an electrohydraulic brake, where two pressure control circuits are connected via one controllable valve (for example, a balance valve), this valve connecting the two pressure control circuits may be actuated to reduce the load on the components of the brake system at a standstill and/or in other given operating states, e.g., at low speeds (e.g., less than 30 km/h), in braking operations where relatively little braking is desired (e.g., up to 30% of the maximum deflection of the brake pedal), when there is a low rate of change in the desired braking (e.g., up to 30% of the maximum possible rate of change), etc. The two pressure control circuits may be linked together in this way. The pressure in both wheel brakes may then be set by only one of the pressure regulators, while the other may be deactivated, has no effect, or is set at "hold pressure," possibly depending on the hydraulic design. This relieves the load on the components of the second pressure regulator. To achieve a uniform load (heating and valve seat wear), one pressure regulator and the other may be used in alternation. Wheel-specific functions such as an anti-skid controller, etc., may not be able to be carried out then. If they respond, the balance valve may be closed again and both regulators may be activated. This measure may be used individually or in combination with the standstill pressure limit described above, depending on the embodiment.

Another exemplary embodiment and/or exemplary method for load reduction may include limiting the pressure buildup gradient or the braking force buildup gradient in general at a standstill or in the corresponding operating situations mentioned above (for example, low speed, low desired braking, small rate of change). Therefore, smaller currents may be needed for the control valves or the electric motor actuators. This may be achieved in combination with at least one of the measures mentioned above, or alone, in all operating phases in which no steep changes in pressure are necessary (i.e., no high dynamic demands are made). In addition to standstill, these may include operating ranges with low speeds, low desired braking, and/or small rates of change.

Another exemplary method for load reduction, which may be used in combination with at least one of the preceding methods or alone, is to completely release the brakes from the individual wheels at a standstill or in one of the driving operating situations mentioned above, for example, as long as its contribution to braking the vehicle can be covered by the other wheels. Both individual wheel brakes as well as multiple wheel brakes, which may be two, especially those on the rear axle, may be especially suitable for this. Thus, for example, the rear axle brakes may be activated only when the driver wants to decelerate strongly (e.g., >20% of the maximum deceleration).

In summary, it should be pointed out that according to the exemplary method described above, and also below, in detail, the load on the components of an electrically controlled brake system may be reduced in at least one operating state by limiting the implementation of and/or the change in the setpoint quantity.

Figure 2:
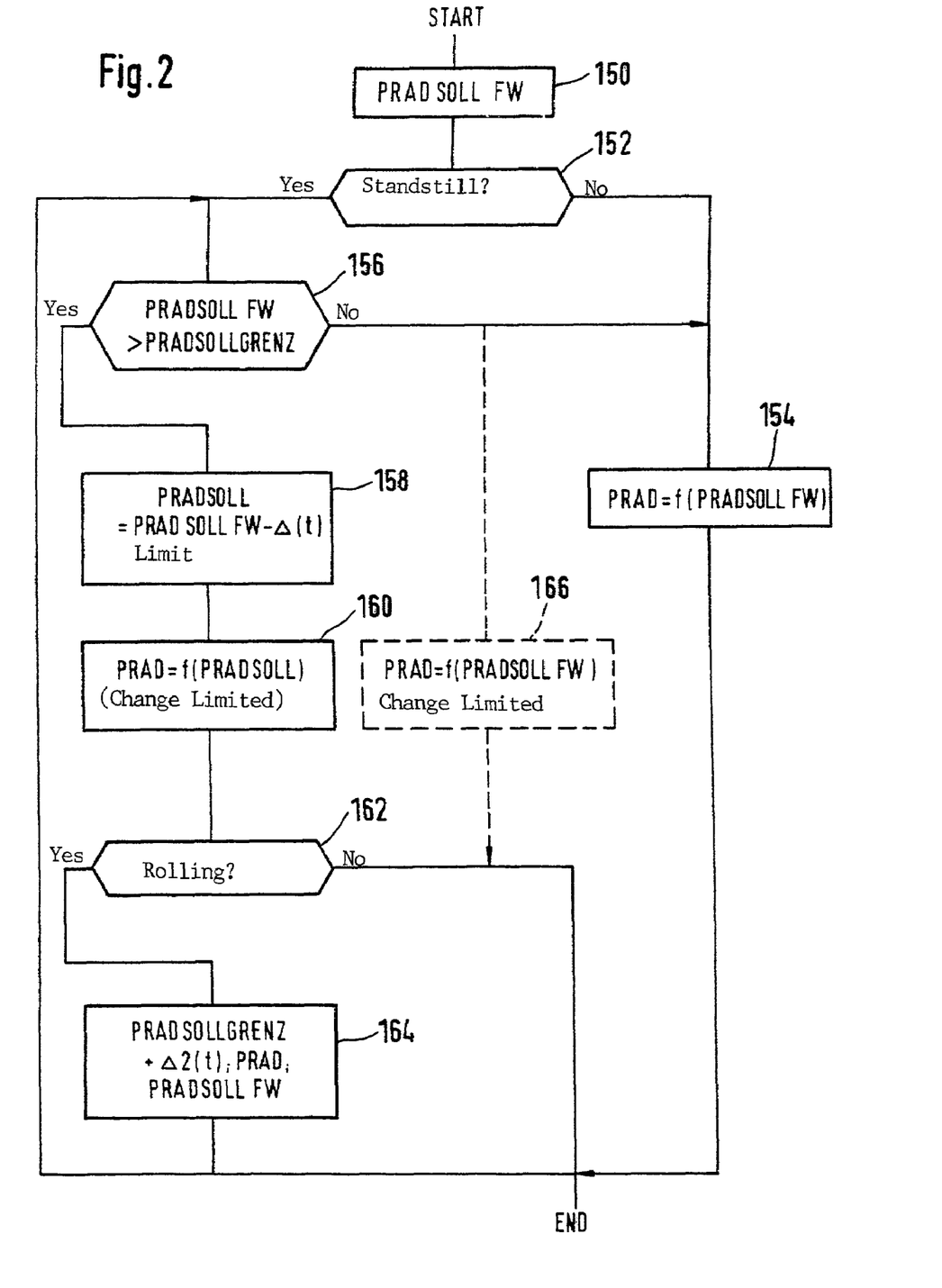
FIG. 2 shows a flow chart which represents an exemplary implementation of the load reducing method in the form of a computer program.

FIG. 2 shows a flow chart illustrating the implementation of a first exemplary method for limiting the standstill pressure or standstill braking force, and/or the change in pressure or force, at a standstill, in the form of a computer program.

The program outlined here may be run through at predefined time intervals after operation of the brake pedal until the brake pedal is released by the driver. This may be the method or procedure on a selected wheel. For the other wheels of the vehicle, corresponding programs may be provided, or the program presented here may be run through for each wheel.

After the program starts, in first step 150, setpoint pressure value PRADSOLLFW, determined on the basis of the deflection of the brake pedal, as described above for the wheel brake in question, may be input. Then in step 152, a check may be performed to determine whether the vehicle is stopped. For example, this may follow on the basis of at least one wheel speed signal, on the basis of which the system might determine whether the vehicle is at a standstill. If there is no standstill detection, then in step 154 wheel brake pressure PRAD may be set on the basis of brake pressure setpoint PPADSOLLFW which may be derived from the driver's desired braking. Then the program may be terminated and run through again in the next time interval.

If it was found in step 152 that the vehicle is at a standstill, then a check may be performed in next step 156 to determine whether setpoint PRADSOLLFW, derived from the driver's desired braking, is greater than a predefined limit value PRADSOLLGRENZ, which represents the standstill limit pressure. If this is not the case, the brake pressure may be set as part of pressure regulation as in normal operation according to step 154. If the setpoint derived from the driver's intent (input) is greater than the limit value, then according to step 158, setpoint PRADSOLL to be set is reduced to the limit value, starting from setpoint PRADSOLLFW derived on the basis of the driver's intent (input), following a predefined time function $\Delta 1$ (t). Then in step 160, wheel brake pressure PRAD on the wheel in question is set on the basis of setpoint PRADSOLL which is reduced in step 158 with each run-through time. A check is performed in the next step 162 to determine whether the vehicle is rolling. If this is not the case, the program is terminated and is run through again at the next time beginning with step 150. If step 162 has shown that the vehicle is rolling, then according to step 164, limit value PRADSOLLGRENZ is increased according to a second time function $\Delta 2$ (t), with the increase being faster than the reduction in step 158.

In another exemplary embodiment, the frequency is increased to the driver's stipulation. Furthermore, wheel brake pressure PRAD is set on the basis of new limit value determined in this way, and brake pressure value PRADSOLLFW derived from the driver's intent (input) is entered. Then the program is repeated with step 156 in the time cycle provided. Thus, if the driver releases the brake pedal, i.e., the vehicle is intentionally allowed to roll, then due to the lowered setpoint in this case, the system detects on the basis of the driver's intent (input) in step 156 that this is smaller than the limit value. Then the brake pressure is lowered in this case according to step 154 and the vehicle is allowed to roll.

In an another exemplary embodiment and/or exemplary method, in addition to the pressure limit, the change in brake pressure over time may also be limited. This is shown in parentheses in step 160 and also by the alternative in dotted lines (step 166) for the case of control at a standstill, depending on the driver's intent, with step 166 replacing the branch to step 152 for this case. The change limit may be implemented by subjecting either the change in setpoint over time, or the actuation signal for the brake actuator, to an increase limit.

The change limit in the manner described here may also be used in one embodiment independently of the standstill limit at a standstill or even in other driving situations, as described above, without any great dynamic demands.

The setpoint limit for the wheel pressure control may also be defined for each individual vehicle. In a first exemplary embodiment and/or exemplary method, its value may be such that it holds a vehicle having an allowed total weight on a slope of a given inclination. In other embodiments, the limit value may be reduced to the extent that the vehicle is no longer rolling. In this case, the function of step 164 is important because if the vehicle rolls here, there is an immediate increase in the limit value and thus in the brake pressure.

Similarly, the method described in conjunction with FIG. 2 may also be used with braking force regulators in electrohydraulic, electropneumatic or electric motor wheel brakes.

Figure 3A:
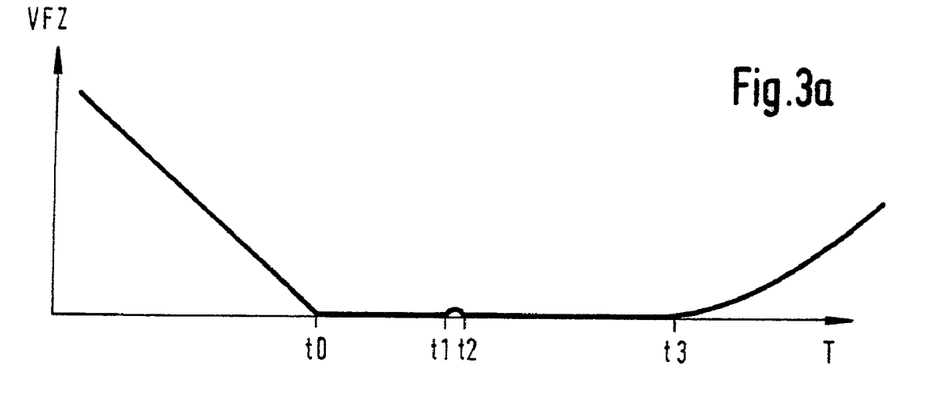
FIG. 3 shows the functioning of an exemplary embodiment on the basis of time charts or graphs.
Figure 3B:
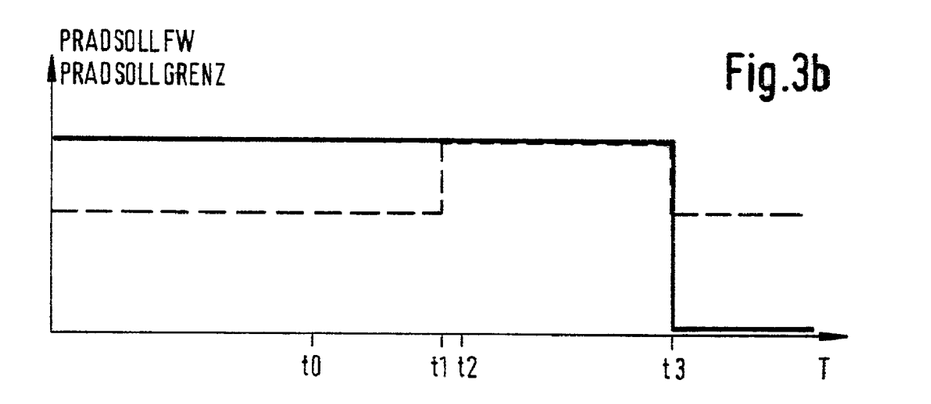
Figure 3C:
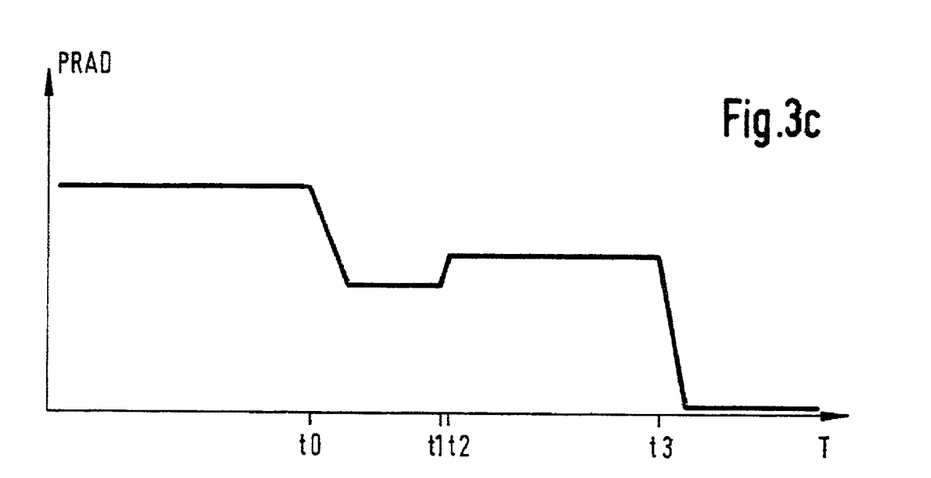

The functioning of the standstill pressure limit is illustrated in FIG. 3 on the basis of a time chart. FIG. 3a shows vehicle speed VFZ over time. FIG. 3b shows setpoint pressure value PRADSOLLFW which over time may depend on the driver's intent and limit pressure PRADSOLLGRENZ. FIG. 3c shows wheel pressure PRAD over time. These diagrams are based on an operating situation in which the vehicle is braked. The setpoint brake pressure derived from the driver's intent (input) may therefore be above the limit value according to the diagram in FIG. 3b. The vehicle speed may drop. At time t0 (see FIG. 3a) the vehicle speed reaches the value 0 and the vehicle is standing still. Therefore at time t0, due to the higher driver's intent value, the wheel brake pressure is reduced to the level determined by limit value PRADSOLLGRENZ up to time t1, as shown in FIG. 3c. At time t1, the vehicle begins to roll (see FIG. 3a). According to FIG. 3b, this may be manifested in an increase in the limit pressure by time t1. Accordingly, the wheel brake pressure may be corrected with a steeper gradient (see FIG. 3c) or it may be increased to the driver's stipulation, with the pressure being increased. The pressure relationships remain the same.

At time t3, the driver releases the brake pedal to drive off. Accordingly, the setpoint brake pressure derived from the driver's intent (input) drops below the limit pressure. This leads to a drop in the wheel brake pressure at time t3 according to FIG. 3c and to an increase in vehicle speed when incline drive forces are in effect (otherwise only when the driver drives away). In an exemplary embodiment, the wheel brake pressure limit value may be reduced again from the original value according to FIG. 3b. In other embodiments, it may remain at the last value.

The limit of the standstill pressure may be implemented in the above embodiment by a limit on the pressure setpoint. In another embodiment, the limit may be achieved by limiting the actual brake pressure value accordingly.

Figure 4:
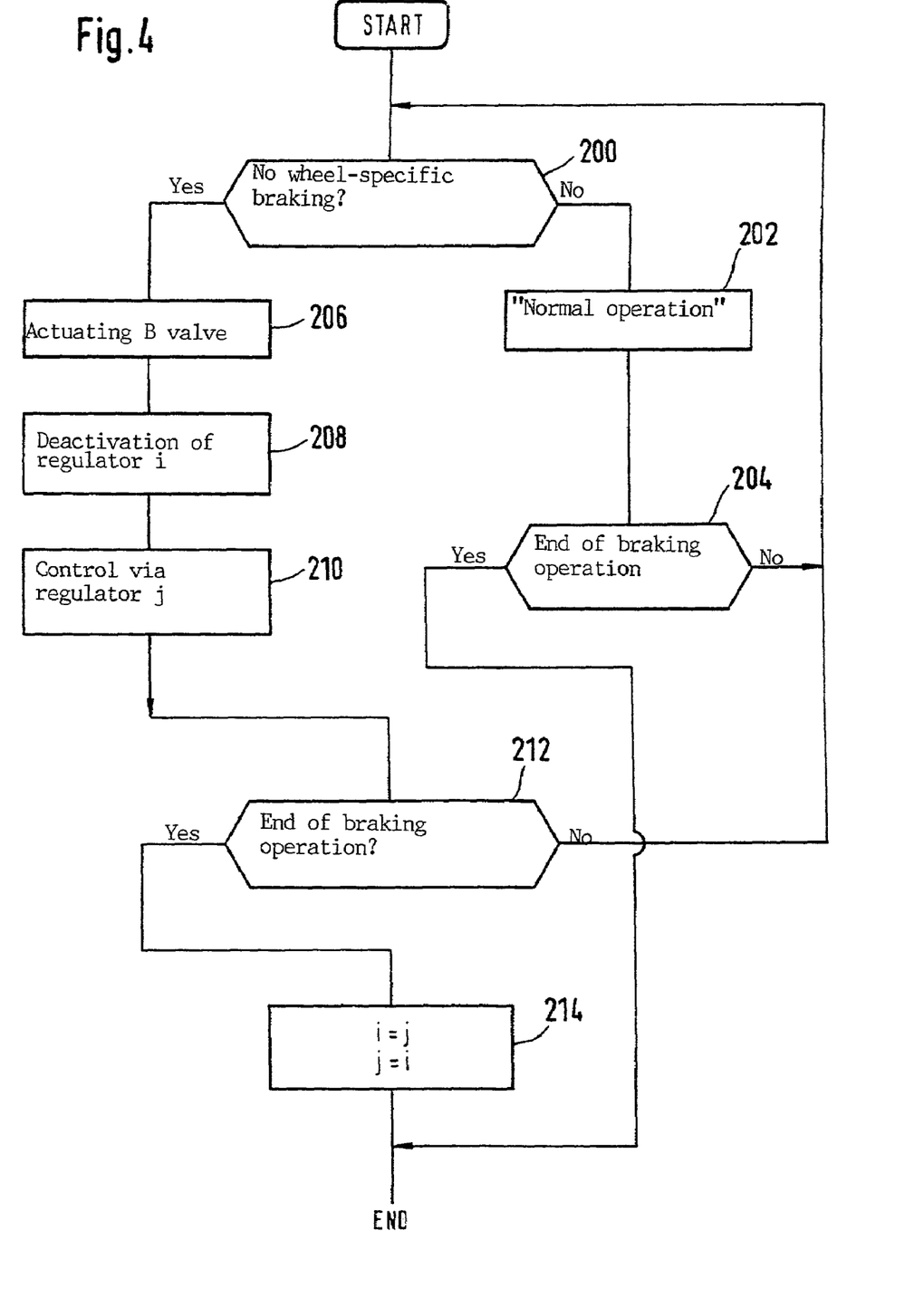
FIG. 4 shows another flow chart which represents another exemplary embodiment and/or exemplary method for providing load reducing brake control in the form of a computer program.

In another exemplary embodiment, two pressure control circuits connected by one electrically controlled valve, as may be the case with an electrohydraulic brake system, may be provided. The program illustrated in FIG. 4 is run through in a predefined cycle from the start of the braking operation until its end. In a first query step 200, a check is performed to determine whether there is an operating state which allows opening of the connection between two pressure control circuits and control of both wheel brakes by just one pressure regulator. This may be the case when vehicle standstill has been detected, the speed of the vehicle is low (e.g., less than 30 km/h), or the driver is requesting either only a slight deceleration of the vehicle or only a small change over time. A prerequisite for this may be that no function which requires a braking measure on individual wheels is active. If these conditions are not met, then the normal operation described above (step 202) may be carried out, and then a check is performed in step 204 to determine whether the braking operation is concluded. This may be the case when the driver no longer wants to brake. If the braking operation is concluded, the program may be terminated and it starts again with the next braking operation. If the braking operation is not concluded, the program may be run through again in the next cycle with step 200.

If step 200 has shown that one of these operating situations prevails, then in step 206, the valve connecting the two pressure control circuits, the balance valve, may no longer be actuated. The valve opens so that in a next step 208, the one pressure regulator (regulator i) may be deactivated, and according to step 210, control of both wheel brakes by the remaining pressure regulator (regulator j) may be performed in the manner described above. In a following step 212, a check may be performed to determine whether the braking operation is concluded. If this is the case, then in step 214, indexes i and j may be exchanged, so that in the next braking operation, control takes place by way of the previously deactivated regulator, while the previously activated regulator may be deactivated. If the braking operation is not concluded, the program may be continued with step 200 in the given cycle. Deactivation of a regulator may be implemented, for example, by setting its setpoint to the value zero.

Deactivation of a regulator is also understood to mean that the regulator goes into its pressure holding state. This may be the case in embodiments in which a discharge valve that is currentless when open, is provided on the wheel brake (i.e., it must be actuated to close it).

This method or procedure may also contribute to the exemplary method described above or it may be used alone to reduce the load on the components of the brake system. The specific implementation of alternation of the active regulators can also be based on operating times, etc.

Figure 5:
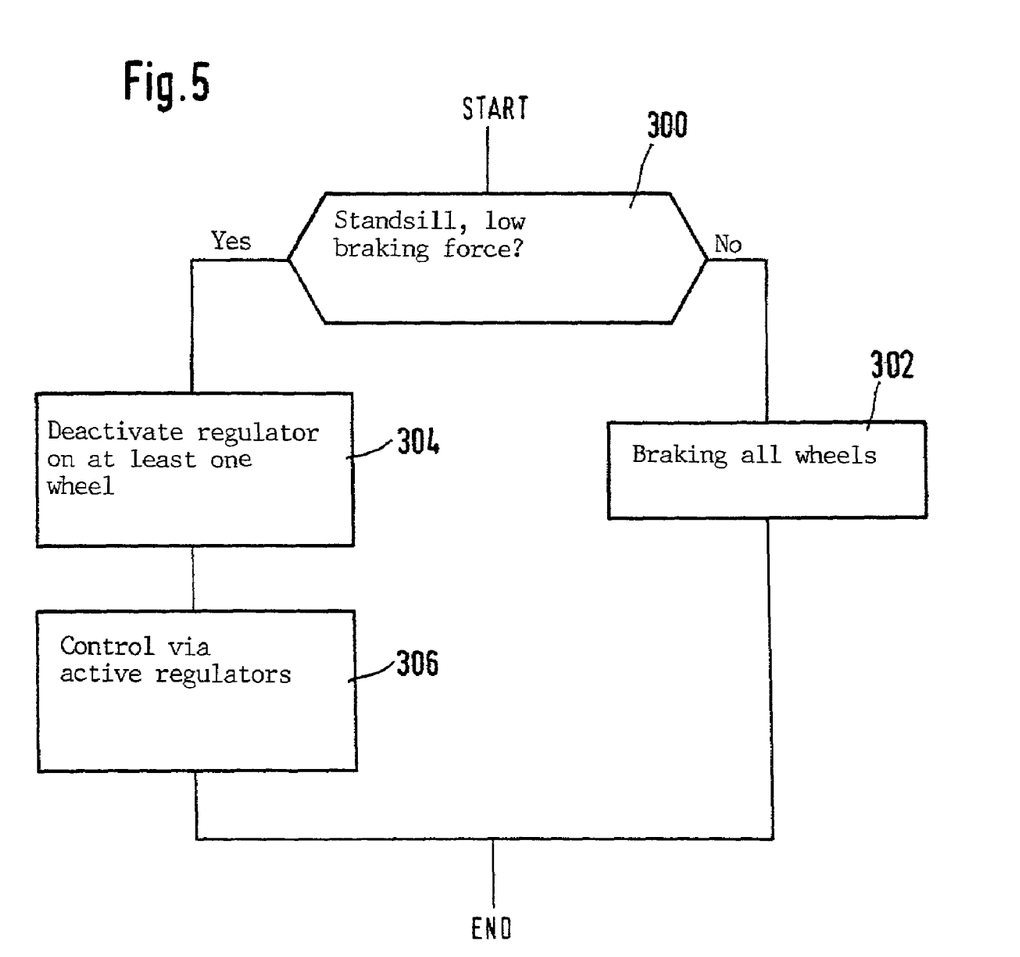
FIG. 5 shows another exemplary embodiment and/or exemplary method on the basis of another flow chart.

Another exemplary embodiment and/or exemplary method provides for individual wheel brakes to be completely released (i.e., for no pressure or braking force to be built up there at all). Implementation of the driver's intent may be limited in this sense. FIG. 5 shows a flow chart representing the macrostructure of a program for carrying out the method or procedure illustrated here. This program may also run through in the given cycle in the case of operation of the brake pedal by the driver. In a first step 300, a check is performed to determine whether the operating situation will allow releasing of the brakes of individual wheels. For example, this might be a standstill situation, a braking situation at a low speed, or a braking situation with low desired braking.

If this is not the case, then according to step 302, this may be performed on all wheels by the corresponding regulators as part of normal braking. However, if such an operating situation has occurred, then according to step 304, at least one or two pressure regulators may be deactivated (i.e., the setpoints are set to a value of 0). This may be, for example, a single wheel or the wheels on one axle (which may be the rear axle). The setpoint, which depends on the driver and is optionally limited by the method or procedure according to FIG. 2, may be set according to step 306 by the regulators of the other wheels. The program which is then terminated may run through again during the braking operation in the given cycle.

Instead of being set by the driver, the desired braking may also be predefined in one embodiment by at least one other control system (e.g., an adaptive cruise control (ACC)).

What is claimed is:

1. A method, comprising:
   determining a value of a setpoint for an operating parameter of a braking system, the parameter selected from a group consisting of a braking pressure and a braking force, wherein the determined value is within a range of setpoint values that are physically implementable by the braking system, the determining being as a function of at least one operation selected from a group consisting of a brake pedal input by a user and operation of at least one other control system;
   reducing the setpoint from the determined value to a limit value upon a determination that the vehicle is in a standstill condition and that the determined value is greater than the limit value;
   regulating the braking system to implement the setpoint limit value for the operating parameter;
   detecting that the vehicle is no longer in the standstill condition after regulating the braking system to implement the limit value of the setpoint;
   increasing the setpoint from the limit value to a second limit value; and
   regulating the braking system to implement the second limit value of the setpoint;
   wherein the second limit value is less than the initially determined value.

2. A method, comprising:
   determining a value of a setpoint for an operating parameter of a braking system, the parameter selected from a group consisting of a braking pressure and a braking force, wherein the determined value is within a range of setpoint values that are physically implementable by the braking system, the determining being as a function of at least one operation selected from a group consisting of a brake pedal input by a user and operation of at least one other control system;
   reducing the setpoint from the determined value to a limit value upon a determination that the vehicle is in a standstill condition and that the determined value is greater than the limit value;
   regulating the braking system to implement the setpoint limit value for the operating parameter;
   determining, as a function of the brake pedal input, a first value of a rate-of-change for the braking system, the rate-of-change selected from the group consisting of a braking pressure rate-of-change and a braking force rate-of-change, wherein the determined first value is within a range of rate-of-change values that are physically implementable by the braking system;

reducing the rate-of-change from the determined first value to a limit value upon a determination that the determined first value is greater than the limit value and the vehicle is a condition selected from a group consisting of a standstill condition and a low-speed condition, wherein the low speed condition includes vehicle conditions where a vehicle speed is less than a predetermined speed value; and regulating the braking system to implement the limit value of the rate-of-change for the braking system.

3. A controller for a braking system of a vehicle, the controller comprising a processor configured to:

determine a value of a setpoint for an operating parameter of a braking system, the parameter selected from a group consisting of a braking pressure and a braking force, wherein the determined value is within a range of setpoint values that are physically implementable by the braking system, the determining being as a function of at least one operation selected from a group consisting of a brake pedal input by a user and operation of at least one other control system;

reduce the setpoint from the determined value to a limit value upon a determination that the vehicle is in a standstill condition and that the determined value is greater than the limit value;

regulate the braking system to implement the setpoint limit value for the operating parameter;

detect that the vehicle is no longer in the standstill condition after regulating the braking system to implement the limit value of the setpoint;

increase the setpoint from the limit value to a second limit value; and regulate the braking system to implement the second limit value of the setpoint;

wherein the second limit value is less than the initially determined value.

4. A controller for a braking system of a vehicle, the controller comprising a processor configured to:

determine a value of a setpoint for an operating parameter of a braking system, the parameter selected from a group consisting of a braking pressure and a braking force, wherein the determined value is within a range of setpoint values that are physically implementable by the braking system, the determining being as a function of at least one operation selected from a group consisting of a brake pedal input by a user and operation of at least one other control system;

reduce the setpoint from the determined value to a limit value upon a determination that the vehicle is in a standstill condition and that the determined value is greater than the limit value; and regulate the braking system to implement the setpoint limit value for the operating parameter;

determine, as a function of the brake pedal input, a first value of a rate-of-change for the braking system, the rate-of-change selected from the group consisting of a braking pressure rate-of-change and a braking force rate-of-change, wherein the determined first value is within a range of rate-of-change values that are physically implementable by the braking system;

reduce the rate-of-change from the determined first value to a limit value upon a determination that the determined first value is greater than the limit value and the vehicle is a condition selected from a group consisting of a standstill condition and a low-speed condition, wherein the low speed condition includes vehicle conditions where a vehicle speed is less than a predetermined speed value; and regulate the braking system to implement the limit value of the rate-of-change for the braking system.

* * * * *